(12) United States Patent
Li et al.

(10) Patent No.: US 10,491,294 B2
(45) Date of Patent: Nov. 26, 2019

(54) SIGNAL PROCESSING APPARATUS, APPARATUS AND METHOD FOR MONITORING CHANNEL SPACING AND SYSTEM

(71) Applicant: Fujitsu Limited, Kawasaki-shi, Kanagawa (JP)

(72) Inventors: Huihui Li, Beijing (CN); Ying Zhao, Beijing (CN); Zhenning Tao, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 36 days.

(21) Appl. No.: 15/493,801

(22) Filed: Apr. 21, 2017

(65) Prior Publication Data

US 2017/0310440 A1 Oct. 26, 2017

(30) Foreign Application Priority Data

Apr. 22, 2016 (CN) .......................... 2016 1 0256383

(51) Int. Cl.
*H04W 4/00* (2018.01)
*H04B 10/077* (2013.01)
(Continued)

(52) U.S. Cl.
CPC ...... *H04B 10/0775* (2013.01); *H04J 14/0224* (2013.01); *H04L 27/0014* (2013.01); *H04L 2027/0028* (2013.01)

(58) Field of Classification Search
CPC ............ H04L 5/0048; H04W 72/0453; H04W 72/0473
See application file for complete search history.

(56) References Cited

U.S. PATENT DOCUMENTS

| 5,812,611 | A | * | 9/1998 | Sogabe | ..................... H03J 7/04 327/47 |
| 6,101,176 | A | * | 8/2000 | Honkasalo | ........... H04B 7/2618 370/335 |

(Continued)

FOREIGN PATENT DOCUMENTS

| CN | 1490955 A | 4/2004 |
| CN | 1937604 A | 3/2007 |

(Continued)

OTHER PUBLICATIONS

Benjamin J. Puttnam et al., "Signal-Signal Crosstalk Measurements in a PPLN-PPLN PSA with Narrow Channel Spacing", 2012 17$^{th}$ Opto-Electronics and Communications Conference Technical Digest, Jul. 2012, pp. 67-68.

(Continued)

*Primary Examiner* — Clemence S Han
(74) *Attorney, Agent, or Firm* — Staas & Halsey LLP

(57) ABSTRACT

A signal processing apparatus and method for monitoring channel spacing which may be configured in a receiver and includes: a first determining unit to determine a frequency range of a pilot of a center channel and a frequency range of a pilot of a neighboring channel using a receive signal; a second determining unit to determine a center channel frequency offset of the center channel pilot according to the center channel frequency range, and determine a frequency offset of the neighboring channel pilot according to the neighboring channel frequency range; and a third determining unit to determine channel spacing between the center channel and the neighboring channel according to the center channel frequency offset, the neighboring channel frequency offset and a frequency of a pilot signal at a transmitter side.

11 Claims, 5 Drawing Sheets

(51) Int. Cl.
  *H04J 14/02* (2006.01)
  *H04L 27/00* (2006.01)

(56) References Cited

U.S. PATENT DOCUMENTS

| | | | |
|---|---|---|---|
| 2002/0119796 A1* | 8/2002 | Vanghi | H04W 28/08 |
| | | | 455/522 |
| 2007/0015482 A1* | 1/2007 | Suominen | H03D 3/007 |
| | | | 455/313 |
| 2008/0299925 A1* | 12/2008 | Walley | H03J 1/0075 |
| | | | 455/161.1 |
| 2009/0028552 A1 | 1/2009 | Zhang et al. | |
| 2009/0323791 A1* | 12/2009 | Yee | H04B 1/707 |
| | | | 375/224 |
| 2011/0194043 A1 | 8/2011 | Barbarossa | |
| 2012/0051737 A1* | 3/2012 | DeAndrea | H04B 10/07955 |
| | | | 398/25 |
| 2013/0182802 A1* | 7/2013 | Kato | H04L 5/0048 |
| | | | 375/340 |
| 2014/0023094 A1 | 1/2014 | Chen et al. | |
| 2015/0295604 A1* | 10/2015 | Cheah | H04B 1/1027 |
| | | | 375/316 |

FOREIGN PATENT DOCUMENTS

| | | |
|---|---|---|
| CN | 1937607 A | 3/2007 |
| CN | 101465687 A | 6/2009 |
| CN | 101765948 A | 6/2010 |
| CN | 101909024 A | 12/2010 |
| CN | 102742234 A | 10/2012 |
| CN | 103674486 A | 3/2014 |
| CN | 105337906 A | 2/2016 |
| EP | 0 788 225 A1 | 8/1997 |

OTHER PUBLICATIONS

Chinese Search Report dated Feb. 3, 2019 in corresponding Chinese Patent Application No. 2016102563838 (2 pages).
Chinese Office Action dated Feb. 3, 2019 in corresponding Chinese Patent Application No. 201610256383.8 (4 pages).
Chinese Office Action dated Oct. 8, 2019 in Chinese Patent Application No. 201610256383.8.

* cited by examiner

SIGNAL PROCESSING APPARATUS, APPARATUS AND METHOD FOR MONITORING CHANNEL SPACING AND SYSTEM

CROSS-REFERENCE TO RELATED APPLICATIONS

This application claims the benefit of Chinese Application No. 201610256383.8, filed Apr. 22, 2016, in the Chinese Intellectual Property Office, the disclosure of which is incorporated herein by reference.

BACKGROUND

1. Field

The present disclosure relates to the field of communication technologies, and in particular to a signal processing apparatus, an apparatus and method for monitoring channel spacing and a system.

2. Description of the Related Art

In a wavelength division multiplexing (WDM) optical communication system, subcarrier data are modulated in several optical carriers independent of each other. Under an ideal condition, wavelengths of lasers are stable, and channel spacing between the subcarriers is constant. In a practical system, as wavelengths of lasers are influenced by variation of driving currents, temperature fluctuation, and resonant cavity aging, etc., wavelengths of output carriers drift in a certain range. Such indefinite variation of wavelengths brings about relatively large influence to the wavelength division multiplexing optical communication system, which is mainly embodied in: 1) occurrence of neighboring channel crosstalk between channels of the subcarriers; and 2) edge channels signals being subjected to more severe distortion.

An effective method for monitoring channel spacing is an important means for overcoming drift of laser wavelengths. On a basis of monitoring channel spacing, the wavelengths of the lasers may be adjusted with respect to feedback, so as to avoid variation of wavelengths to a great extent, thereby achieving locking of channel spacing. Stable channel spacing of subcarriers can not only avoid neighboring channel crosstalk, but also make spectrum resources being used more efficiently, thereby improving spectrum utilization.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

It was found by the inventors that channel spacing monitoring is an effective means for further optimizing a wavelength division multiplexing optical communication system. In a process of channel spacing monitoring, introduction of extra hardware overhead is not expected, hence, attention is paid to a scheme in which wavelength monitoring based on digital signal processing is performed in a receiver.

Embodiments of the present disclosure provide a signal processing apparatus, an apparatus and method for monitoring channel spacing and a system, in which based on signal processing at a receiver side, channel spacing of subcarriers is obtained without introducing overlarge complexity.

According to a first aspect of the embodiments of the present disclosure, there is provided a signal processing apparatus, configured in a transmitter, the apparatus including:

a loading unit configured to load a pilot signal to a transmitting signal, at a predetermined confidence probability, power of the pilot signal being larger than power of all frequency points in a predetermined frequency domain range by a first threshold.

According to a second aspect of the embodiments of the present disclosure, there is provided a transmitter, including the apparatus as described in the first aspect.

According to a third aspect of the embodiments of the present disclosure, there is provided an apparatus for monitoring channel spacing, configured in a receiver, the apparatus including:

a first determining unit configured to determine a frequency range of a pilot of a center channel and a frequency range of a pilot of a neighboring channel by using a receiving signal;

a second determining unit configured to determine a frequency offset of the pilot of the center channel according to the frequency range of the pilot of the center channel, and determine a frequency offset of the pilot of the neighboring channel according to the frequency range of the pilot of the neighboring channel; and a third determining unit configured to determine channel spacing between the center channel and the neighboring channel according to the frequency offset of the pilot of the center channel, the frequency offset of the pilot of the neighboring channel and a frequency of a pilot signal loaded at a transmitter side.

According to a fourth aspect of the embodiments of the present disclosure, there is provided a receiver, including the apparatus as described in the third aspect.

According to a fifth aspect of the embodiments of the present disclosure, there is provided a communication system, including a transmitter and a receiver; wherein, the transmitter is configured to: load a pilot signal to a transmitting signal, at a predetermined confidence probability, power of the pilot signal being larger than power of all frequency points in a predetermined frequency domain range by a first threshold value;

and the receiver is configured to: determine a frequency range of a pilot of a center channel and a frequency range of a pilot of a neighboring channel by using a receiving signal; determine a frequency offset of the pilot of the center channel according to the frequency range of the pilot of the center channel; determine a frequency offset of the pilot of the neighboring channel according to the frequency range of the pilot of the neighboring channel; and determine channel spacing between the center channel and the neighboring channel according to the frequency offset of the pilot of the center channel, the frequency offset of the pilot of the neighboring channel and a frequency of a pilot signal loaded at a transmitter side.

According to a sixth aspect of the embodiments of the present disclosure, there is provided a signal processing method, applicable to a transmitter, the method including:

a pilot signal is loaded to a transmitting signal, at a predetermined confidence probability, power of the pilot signal being larger than power of all frequency points in a predetermined frequency domain range by a first threshold.

According to a seventh aspect of the embodiments of the present disclosure, there is provided a method for monitoring channel spacing, applicable to a receiver, the method including:

a frequency range of a pilot of a center channel and a frequency range of a pilot of a neighboring channel is determined by using a receiving signal;

a frequency offset of the pilot of the center channel is determined according to the frequency range of the pilot of the center channel, and a frequency offset of the pilot of the neighboring channel is determined according to the frequency range of the pilot of the neighboring channel; and channel spacing between the center channel and the neighboring channel is determined according to the frequency offset of the pilot of the center channel, the frequency offset of the pilot of the neighboring channel and a frequency of a pilot signal loaded at a transmitter side.

An advantage of the embodiments of the present disclosure exists in that with the embodiments of this disclosure, by using the features of the pilot signal loaded at the transmitter side, the frequency offset of the pilot is estimated by using the method based on the frequency domain signal processing in the receiver side, thereby achieving judgment of channel spacing.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Figure 1:
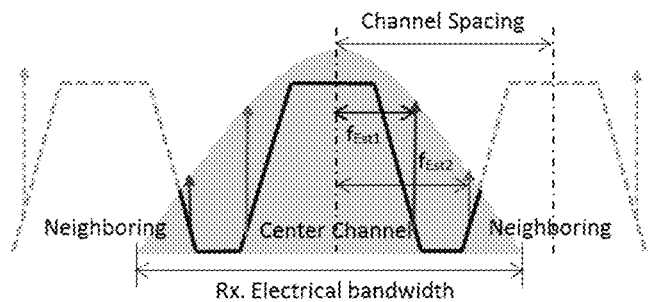
FIG. 1 is a schematic diagram of a principle of pilot-based channel spacing monitoring.

FIG. 1 is a schematic diagram of a principle of pilot-based channel spacing monitoring. As shown in FIG. 1, the shadow portion denotes a response of a filter of an optical receiver. It can be seen from FIG. 1 that within a bandwidth range of the optical receiver, besides a center channel needing to be demodulated, information on left and right neighboring channels received simultaneously is also included, which is presented in a spectrum as a range shown in broadened solid lines in FIG. 1. Within this range, as spectra of the neighboring channels are incomplete, spacing between two channels cannot be directly judged. In this embodiment, a characteristic of a change of channel spacing may be reflected by using a change of a pilot frequency, and the spacing between the channels may be obtained by respectively estimating a frequency offset of the pilot of the center channel and a frequency offset of a pilot of a neighboring channel.

As shown in FIG. 1, assuming that a pilot frequency loaded at the transmitter side is $f_p$, after frequency domain signal processing at a receiver side, the frequency offset $f_{Est1}$ of the pilot of the center channel and the frequency offset $f_{Est2}$ of the pilot of the neighboring channel may be estimated, and a relationship between a frequency offset of a pilot and spacing between two adjacent channels may be expressed as:

$$\text{spacing} = |f_{Est2} - f_{Est1}| + 2 \ast f_p \quad \text{formula 1.}$$

It can be seen from formula 1 that only if the frequency offset of the pilot of the center channel and the frequency offset of the pilot of the neighboring channel are estimated, spacing between the two adjacent channels may be calculated.

The embodiments of this disclosure shall be described below with reference to the accompanying drawings and particular implementations. In the following description, a WDM optical communication system is taken as an example. However, the embodiments of this disclosure are not limited thereto, and the methods provided by the embodiments of this disclosure are applicable to any communication systems needing to perform channel spacing monitoring.

Embodiment 1

Figure 2:
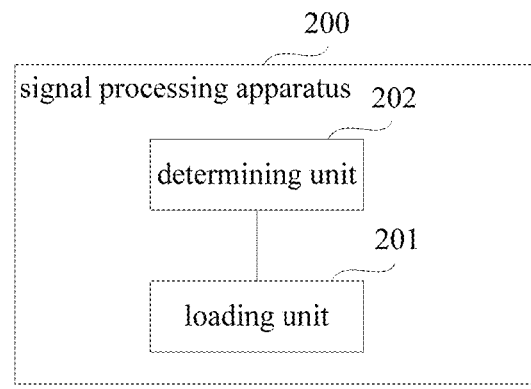
FIG. 2 is a schematic diagram of a signal processing apparatus of Embodiment 1.

An embodiment of this disclosure provides a signal processing apparatus, such as a computer or communication signal processor, configured in a transmitter of a WDM optical communication system. FIG. 2 is a schematic diagram of a structure of the apparatus. As shown in FIG. 2, the apparatus 200 includes a loading unit or loader 201, which is configured to load a pilot signal to a transmitting signal, at a predetermined confidence probability, power of the pilot signal being larger than power of all frequency points in a predetermined frequency domain range by a first threshold.

In an implementation of this embodiment, the power of the pilot signal may be determined by a determining unit or determiner 202. In this implementation, the determining unit 202 may determine reference power of the pilot signal according to a receiver response, variance of the transmitting signal, the predetermined frequency domain range and the predetermined confidence probability, and take a sum of the reference power of the pilot signal and the first threshold as the power of the pilot signal.

Figure 3:
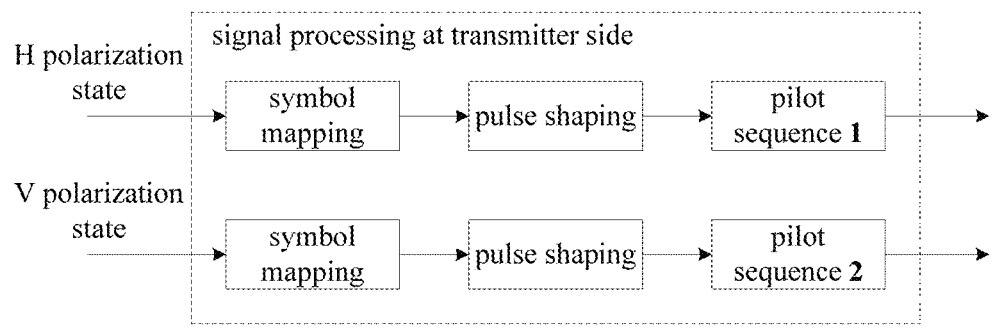
FIG. 3 is a schematic diagram of an implementation of loading a pilot signal to a transmitting signal.

FIG. 3 is a schematic diagram of an implementation of loading the pilot signal to the transmitting signal by the loading unit 201. As shown in FIG. 3, in this implementation, the transmitting signal contains input data in an H polarization state and input data in a V polarization state; wherein, the input data in the H polarization state are inputted into a digital-to-analog conversion module (not shown) after being symbol mapped, pulse shaped and loaded with a pilot sequence 1; likewise, the input data in the V polarization state are inputted into an analog-to-digital conversion module (not shown) after being symbol mapped, pulse shaped and loaded with a pilot sequence 2. In this implementation, the pilot sequence 1 and the pilot sequence 2 may be identical signals, and may also be different signals.

This implementation shall be described taking that a pilot type of the loaded pilot signal is a time domain continuous pilot and the loading unit 201 loads different pilot signals to the input data in the two polarization states as an example.

The pilot signal loaded to the input data in the H polarization state may be expressed as:

$$p^H(t)=A*e^{j2\pi f_p t} \quad \text{formula 2;}$$

and the pilot signal loaded to the input data in the V polarization state may be expressed as:

$$p^V(t)=A*e^{-j2\pi f_p t} \quad \text{formula 3.}$$

In the above two formulae, A denotes a peak voltage of the pilot signal, and $f_p$ denotes a frequency of the pilot signal. In this implementation, the peak voltages of the loaded pilot signals in the H and V polarization states are equal, this may ensure that power in the two polarization states is equal, and a special pilot signal will not appear, which may affect the performance of the system.

In this implementation, the frequency of the pilot signal is not limited, but the power of the pilot signal is required to be maxim in a certain frequency range. As a value of the power of the pilot signal is decided by the peak voltage, a rule for selecting the peak voltage of the pilot signal is given in this implementation. In this implementation, the determining unit 202 may set the power of the pilot signal according to its statistical characteristic by modeling the power spectrum density of the pilot signal. The description is given below.

Within a frequency domain range [$f_1$ $f_2$], a joint accumulated distribution function of a power spectral density of a receiving signal may be expressed as below:

$$F_P = \prod_{f=f1}^{f2} 1 - e^{-1/(2*|H(f)|^2 * \sigma^2) * 10^{\frac{P}{10}}} ; \quad \text{formula 4}$$

where, |H(f)| is a response of the system, $\sigma^2$ is the variance of the transmitting signal, and P is a power value (in dB) to which a corresponding frequency point corresponds. Then, a probability that all signal power values to which frequency points in [$f_1$ $f_2$] correspond are less than T may be expressed as:

$$p(\text{Power}<T)=F_p(T) \quad \text{formula 5.}$$

According to formula 5, a corresponding power value T at a confidence probability p may be obtained, that is, the probability that all signal power values to which frequency points in [$f_1$ $f_2$] correspond are less than T is p.

In this implementation, in order to ensure that the power value of the pilot signal is maximum within the frequency domain range [$f_1$ $f_2$], a protection power value X (a first threshold) is introduced, and a magnitude of the protection power value decides the power value of the pilot signal. In this implementation, the determining unit 202 may determine the reference power T of the pilot signal according to formulae 4 and 5, and take T+X as the power of the pilot signal. Hence, a magnitude of the power value of the pilot signal is directed theoretically.

In this embodiment, in addition to the above loading unit 201 and determining unit 202, the signal processing apparatus 200 may further include other signal processing units, such as a symbol mapping unit, a pulse shaping filter, an analog-to-digital converter, and a modulator etc. The prior art with respect to a transmitter or transmitter side signal processing may be referred to for particular implementations of these components, and shall not be described herein any further.

With the apparatus of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 2

Figure 4:
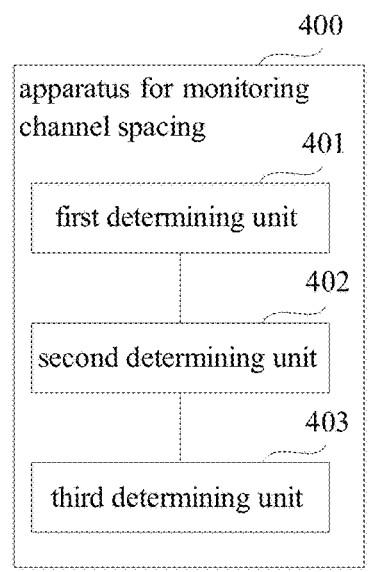
FIG. 4 is a schematic diagram of an apparatus for monitoring channel spacing of Embodiment 2.

An embodiment of this disclosure provides an apparatus for monitoring channel spacing, such as a computer or communication signal processor, configured in a receiver of a WDM optical communication system. FIG. 4 is a schematic diagram of a structure of the apparatus. As shown in FIG. 4, the apparatus 400 includes: a first determining unit 401, a second determining unit 402 and a third determining unit 403. In this embodiment, the first determining unit 401 is configured to determine a frequency range of a pilot of a center channel and a frequency range of a pilot of a neighboring channel by using a receiving signal; the second determining unit 402 is configured to determine a frequency offset of the pilot of the center channel according to the frequency range of the pilot of the center channel, and determine a frequency offset of the pilot of the neighboring channel according to the frequency range of the pilot of the neighboring channel; and the third determining unit 403 is configured to determine channel spacing between the center channel and the neighboring channel according to the frequency offset of the pilot of the center channel, the frequency offset of the pilot of the neighboring channel and a frequency of a pilot signal loaded at a transmitter side.

In the apparatus of this embodiment, by using the receiving signal received by the receiver, the first determining unit 401 coarsely determines the frequency range of the pilot of the center channel and the frequency range of the pilot of the neighboring channel first, then the second determining unit 402 finely estimates the frequency offset of the pilot of the center channel and the frequency offset of the pilot of the neighboring channel, and the third determining unit 403 determines the channel spacing between the center channel and the neighboring channel. As a two-step frequency offset estimation method is used, precision of estimation of channel spacing is improved.

In this embodiment, the receiving signal is received from the receiver, and contains the pilot signal loaded to the transmitting signal at the transmitter side. Features of the pilot signal are identical to that described in Embodiment 1, the contents of which being incorporated herein, and being not going to be described herein any further. For example, at a predefined confidence probability, a power value of the pilot signal is larger than power values of all frequency points in a predetermined frequency domain range by a first threshold.

Figure 5:
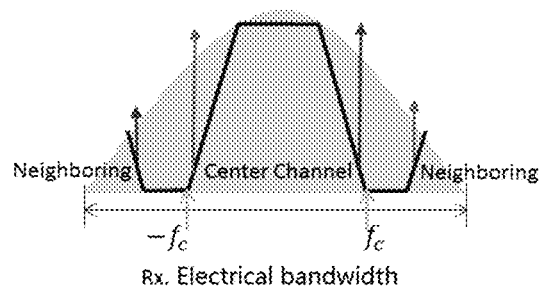
FIG. 5 is a schematic diagram of a spectrum of a receiving signal.

FIG. 5 is a schematic diagram of a spectrum of the receiving signal. As shown in FIG. 5, relative to the pilot, the signal has a very wide bandwidth. In this embodiment, the second determining unit 402 judges each frequency point in the frequency range (fine estimation of frequency offset), and if the whole signal bandwidth is directly taken, there will be many frequency points, and the calculation complexity will be very high. Therefore, in this embodiment, the first determining unit 401 is used first to roughly determine a range of the pilot (coarse estimation of frequency offset).

In this embodiment, for the center channel, the first determining unit 401 may perform coarse frequency offset estimation according to the wavelength drifting range designated by the laser, so as to obtain the frequency range of the pilot of the center channel.

For example, assuming that the frequency $f_p$ of the pilot signal loaded at the transmitter side is 16 GHz and a wavelength drifting range of an integrated tunable laser module is ±1.25 GHz, according to these data, the first determining unit 401 may directly estimate that the frequency range of the pilot of the center channel is about [14.75 GHz-17.75 GHz].

In this embodiment, for the neighboring channel, as the channel spacing between the center channel and the neighboring channel is unknown, the frequency range of the pilot of the neighboring channel is hard to be determined. In this implementation, the first determining unit 401 may take a range of the neighboring channel as the frequency range of the pilot of the neighboring channel, and determine the frequency range of the pilot of the neighboring channel by performing frequency offset estimation on the neighboring channel.

In an implementation, the first determining unit 401 may determine that a bandwidth of a signal passing through a shaping filter as an initial frequency of the neighboring channel according to a bandwidth of an input signal at the transmitter side and a roll-off coefficient, and take a frequency range starting from the initial frequency of the neighboring channel to a maximum value of a receiver bandwidth as the frequency range of the pilot of the neighboring channel.

For example, in this implementation, as shown in FIG. 3, a raised-root cosine filter may be selected and used as the pulse-shaping filter of the transmitter side, and the roll-off coefficient is α, hence, the bandwidth of a signal passing through the shaping filter may be calculated as:

$$f_c = \frac{1+\alpha}{2} \times B. \qquad \text{formula 6}$$

In this formula, B is the input signal bandwidth of the transmitter side. After passing through the shaping filter, the bandwidth of the input signal is expanded to $2 \times f_c$, in which case, as shown in FIG. 5, the first determining unit 401 may take $f_c$ as the initial frequency of the right neighboring channel, and take parts within the bandwidth range of the receiver larger than $f_c$ as the frequency range of the right neighboring channel. Likewise, as shown in FIG. 5, the first determining unit 401 may take $-f_c$ as the initial frequency of the left neighboring channel, and take parts within the bandwidth range of the receiver smaller than $-f_c$, as the frequency range of the left neighboring channel.

In another implementation, the first determining unit 401 may perform envelope extraction on the power spectrum of the receiving signal, take a frequency to which a first bottom in a frequency range greater than the frequency offset of the pilot of the center channel corresponds as an initial frequency of a neighboring channel, and take a frequency range starting from the initial frequency of the neighboring channel to a maximum value of a receiver bandwidth as a frequency range of the pilot of the neighboring channel.

In this implementation, assuming that the frequency offset $f_{Est1}$ of the pilot of the center channel has been estimated, the first determining unit 401 may find the first bottom in a range greater than $f_{Est1}$, and take a frequency to which it corresponds as the initial frequency of the neighboring channel, and take the frequency range starting from the initial frequency to the maximum range of the receiver bandwidth as the frequency range of the pilot of the neighboring channel. In this implementation, in order to ensure a precision of the method, envelope extraction may be performed first on the power spectrum of the receiving signal.

Figure 6:
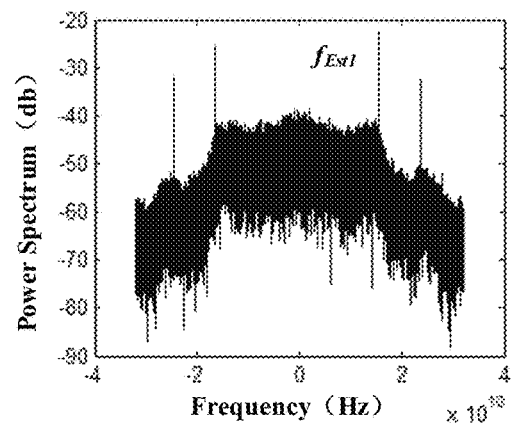
FIG. 6 is a schematic diagram of a power spectrum of a receiving signal.
Figure 7:
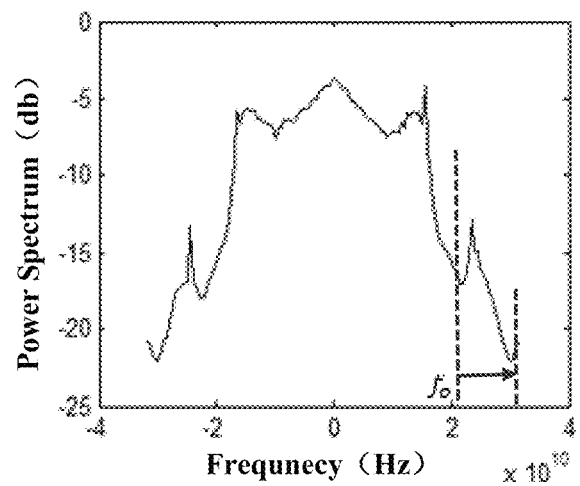
FIG. 7 is a schematic diagram of a power spectral envelope.

FIG. 6 is a schematic diagram of the power spectrum of the receiving signal, and FIG. 7 is a schematic diagram of a power spectrum obtained after envelope extraction is performed on the power spectrum of the receiving signal shown in FIG. 6.

As shown in FIG. 6, the receiving signal is a sampling sequence extracted from the receiver, and the power spectrum reflects a shape of a subcarrier channel. However, due to randomness of a data signal, the power spectrum fluctuates in a large range. In this implementation, effects of random data may be removed by performing segmentation average by the first determining unit 401 to the receiving signal. For example, the sampling sequence extracted from the receiver is divided into subsequences of M segments, each of the M segments having N points, then fast Fourier transform is performed on each segment of subsequences to calculate its spectrum, thereafter, a modulus square of each segment of spectra is calculated to reflect a power spectral shape in the frequency domain, and finally, an average power spectrum of M segments is calculated by using their power spectra. Hence, random information on each segment of subsequences may be efficiently suppressed after the averaging, output power spectra being as shown in FIG. 7. Thus, the power spectrum envelope is extracted.

In this implementation, the first determining unit 401 may find the first bottom in the frequency range greater than $f_{Est1}$ in the power spectrum shown in FIG. 7 and take the frequency to which it corresponds as the initial frequency of the neighboring channel, such as $f_0$ shown in FIG. 7; and then take the part in the receiver bandwidth range of the receiver greater than $f_0$ as the frequency range of the pilot of the right neighboring channel. A manner of processing for the left neighboring channel is similar to that for the right neighboring channel, and shall not be described herein any further.

The above two manners for determining the frequency ranges of the pilots of the neighboring channels are illustrative only, and in particular implementations, the frequency ranges of the pilots of the neighboring channels may be determined according to other policies or principles.

In this embodiment, after obtaining the respective frequency ranges of the pilots of the center channel and the neighboring channel by the first determining unit 401 coarsely estimating the frequency offset of the received signal, the second determining unit 402 may perform finely frequency offset estimation within the above respective frequency ranges of the pilots of the center channel and the neighboring channel, so as to obtain respective particular frequencies of the pilots of the center channel and the neighboring channel.

In this embodiment, for the frequency offset of the pilot of the center channel, the second determining unit 402 may find a frequency point satisfying the following condition from the frequency range of the pilot of the above center channel: a power value to which the frequency point corresponds is larger than power values of a predetermined number of frequency points around the frequency point by the first threshold, and then take the frequency to which the frequency point corresponds as the frequency offset of the pilot of the center channel.

In this embodiment, for a frequency offset of a pilot of a neighboring channel, the second determining unit 402 may find a frequency point satisfying the following condition from a frequency range of the pilot of the above neighboring channel: a power value to which the frequency point corresponds is larger than power values of a predetermined number of frequency points around the frequency point by the first threshold, and then take the frequency to which the frequency point corresponds as the frequency offset of the pilot of the neighboring channel.

In this embodiment, as the pilot having specific features is loaded to the transmitting signal at the transmitter side (as described in Embodiment 1, which shall not be described herein any further), it can be seen from the power spectrum of the receiving signal given by FIG. 6 that the power value of the pilot is maximum near the frequency point of the pilot. According to this phenomenon, in this embodiment, the second determining unit 402 may respectively judge each frequency point in the frequency range of the pilot, such as judge whether the power value to which the frequency point corresponds is larger than power values of K frequency points around it by X (a protection power value), and if yes, take the frequency of the frequency point as the frequency offset of the pilot to be estimated; where, K is the number of frequency points in the above-described predetermined frequency domain range [$f_1$ $f_2$].

The frequency offset $f_{Est1}$ of the pilot of the center channel and the frequency offset $f_{Est2}$ of the pilot of the neighboring channel may be estimated by the second determining unit 402, hence, the third determining unit 403 may estimate the channel spacing between the center channel and the neighboring channel according to the above-described formula 1.

With the apparatus of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 3

Figure 8:
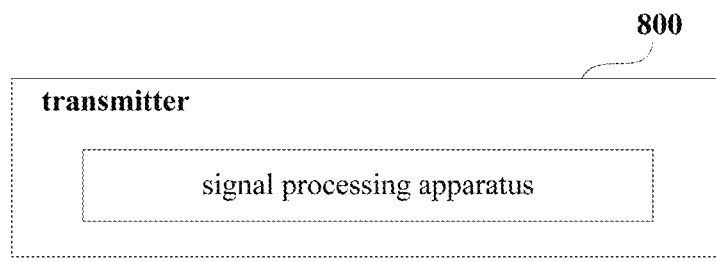
FIG. 8 is a schematic diagram of a transmitter of Embodiment 3.

An embodiment of this disclosure provides a transmitter. FIG. 8 is a schematic diagram of the transmitter. As shown in FIG. 8, the transmitter 800 includes the signal processing apparatus as described in Embodiment 1. As the signal processing apparatus has been described in detail in Embodiment 1, its contents are incorporated herein, and shall not be described herein any further.

Figure 9:
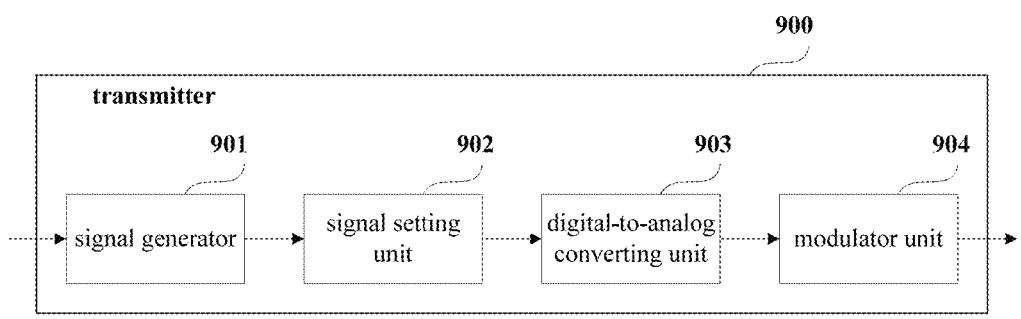
FIG. 9 is a schematic diagram of a systematic structure of the transmitter of Embodiment 3.

FIG. 9 is a schematic diagram of a systematic structure of the transmitter. As shown in FIG. 9, the transmitter 900 includes: a signal generator 901, a signal setting unit 902, a digital-to-analog converting unit 903 and a modulator unit 904;

The signal generator 901 generates digital signals according to transmitting data, the signal setting unit 902 performs corresponding set on the digital signals generated by the signal generator 901, the digital-to-analog converting unit 903 performs digital-to-analog conversion on the digital signals, and the modulator unit 904 performs modulation by taking the signals converted by the digital-to-analog converting unit 903 as modulation signals.

In this embodiment, the functions of the signal processing apparatus 200 described in Embodiment 1 may be integrated into the signal generator 901. As the signal processing apparatus 200 has been described in detail in Embodiment 1, its contents are incorporated herein, and shall not be described herein any further.

The systematic structure of the transmitter shown in FIG. 9 is illustrative only, and in particular implementation, some components may be added or some components may be reduced as demanded.

With the transmitter of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 4

Figure 10:
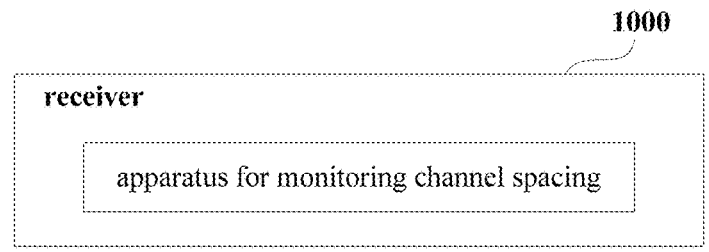
FIG. 10 is a schematic diagram of a receiver of Embodiment 4.

An embodiment of this disclosure provides a receiver. FIG. 10 is a schematic diagram of the receiver. As shown in FIG. 10, the receiver 1000 includes the apparatus for monitoring channel spacing as described in Embodiment 2. As the apparatus for monitoring channel spacing 400 has been described in detail in Embodiment 2, its contents are incorporated herein, and shall not be described herein any further.

Figure 11:
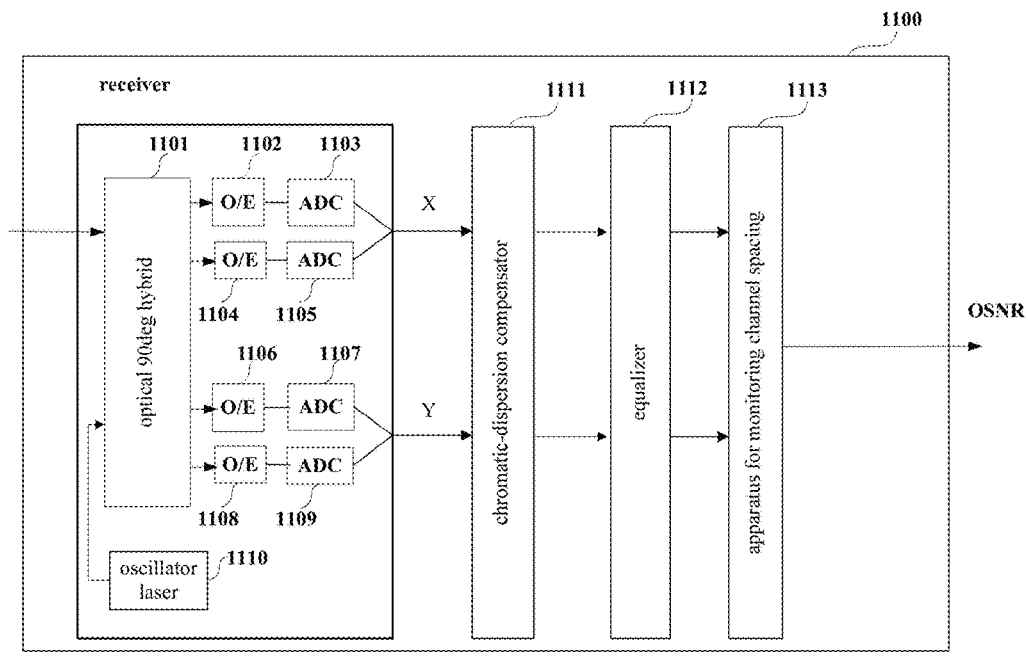
FIG. 11 is a schematic diagram of a systematic structure of the receiver of Embodiment 4.

FIG. 11 is a schematic diagram of a systematic structure of the receiver. As shown in FIG. 11, the receiver 1200 includes:

a front end, which is configured to convert inputted optical signals into baseband signals in two polarization states. In the embodiment of the present disclosure, the two polarization states may include an H polarization state and a V polarization state.

As show in FIG. 11, the front end includes: an oscillator laser 1110, an optical 90 deg hybrid 1101, optoelectronic (O/E) detectors 1102, 1104, 1106 and 1108, analog-to-digital converters (ADCs) 1103, 1105, 1107 and 1109, a chromatic-dispersion compensator 1111, an equalizer 1112 and an apparatus 1113 for monitoring channel spacing; wherein, a structure and functions of the apparatus 1113 for monitoring channel spacing are identical to that described in Embodiment 2, and shall not be described herein any further; the oscillator laser 1110 is configured to provide a local light source, and optical signals are converted into baseband signals in a polarization state after passing through the optical 90 deg hybrid 1101, the optoelectronic (O/E) detectors 1102 and 1104 and the analog-to-digital converters (ADCs) 1103 and 1105, and are converted into baseband signals in another polarization state after passing through the optical 90 deg hybrid 1101, the optoelectronic (O/E) detectors 1106 and 1108 and the analog-to-digital converters (ADCs) 1107 and 1109; and a particular process of implementation is similar to that in the prior art, and shall not be described herein any further.

Furthermore, if a frequency offset and a phase noise have effects on estimation of an OSNR, the receiver 1100 may include a frequency offset compensator and a phase noise compensator (not shown).

With the receiver of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 5

Figure 12:
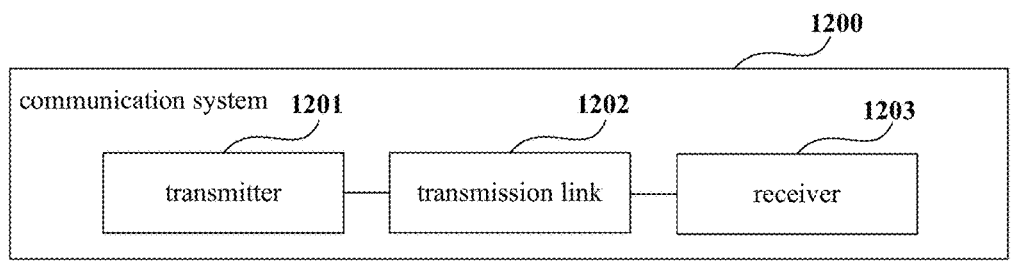
FIG. 12 is a schematic diagram of a communication system of Embodiment 5.

An embodiment of this disclosure provides a communication system. FIG. 12 is a schematic diagram of structure of the communication system of this embodiment. As shown in FIG. 12, the communication system 1200 includes a transmitter 1201, a transmission link 1202 and a receiver 1203; wherein, a structure and functions of the transmitter 1201 are identical to those described in Embodiment 3, and a structure and functions of the receiver 1203 are identical to those described in Embodiment 4, which shall not be describe herein any further. And the transmission link 1202 may have a structure and functions of a transmission link in the prior art, and the structure and functions of the transmission link are not limited in the embodiment of the present disclosure.

With the communication system of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 6

An embodiment of this disclosure provides a signal processing method, applicable to a transmitter in a communication system. As principles of the method for solving problems are identical to that of the apparatus in Embodiment 1, the implementation of the apparatus in Embodiment 1 may be referred to for implementation of this method, with identical contents being not going to be described herein any further.

Figure 13:
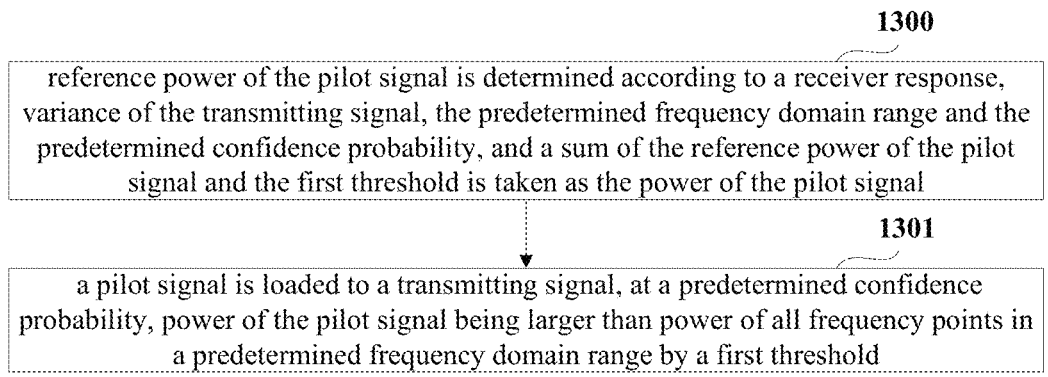
FIG. 13 is a schematic diagram of a signal processing method of Embodiment 6.

FIG. 13 is a schematic diagram of the signal processing method of this embodiment. As shown in FIG. 13, the method includes:

step 1301: a pilot signal is loaded to a transmitting signal, at a predetermined confidence probability, power of the pilot signal being larger than power of all frequency points in a predetermined frequency domain range by a first threshold.

In this embodiment, the method may further include:

step 1300: reference power of the pilot signal is determined according to a receiver response, variance of the transmitting signal, the predetermined frequency domain range and the predetermined confidence probability, and a sum of the reference power of the pilot signal and the first threshold is taken as the power of the pilot signal.

In this embodiment, the power of the pilot signal has been described in detail in Embodiment 1, its contents being incorporated herein, and being not going to be describe herein any further, With the method of this embodiment, by using the features of the pilot signal loaded at the transmitter side, the frequency offset of the pilot is estimated at the receiver side by using the method based on the frequency domain signal processing, thereby achieving judgment of channel spacing.

Embodiment 7

An embodiment of this disclosure provides a method for monitoring channel spacing, applicable to a receiver in a communication system. As principles of the method for solving problems are identical to that of the apparatus in Embodiment 2, the implementation of the apparatus in Embodiment 2 may be referred to for implementation of this method, with identical contents being not going to be described herein any further.

Figure 14:
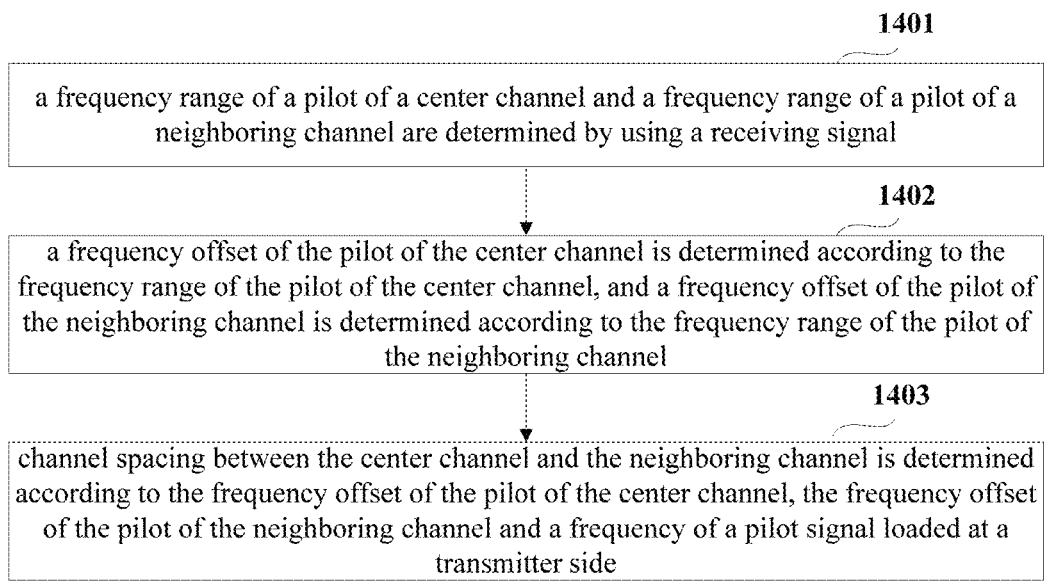
FIG. 14 is a schematic diagram of a method for monitoring channel spacing of Embodiment 7.

FIG. 14 is a schematic diagram of the signal processing method which may be performed by a computer or communication signal processor. As shown in FIG. 14, the method includes:

step 1401: a frequency range of a pilot of a center channel and a frequency range of a pilot of a neighboring channel are determined by using a receiving signal;

step 1402: a frequency offset of the pilot of the center channel is determined according to the frequency range of the pilot of the center channel, and a frequency offset of the pilot of the neighboring channel is determined according to the frequency range of the pilot of the neighboring channel; and step 1403: channel spacing between the center channel and the neighboring channel is determined according to the frequency offset of the pilot of the center channel, the frequency offset of the pilot of the neighboring channel and a frequency of a pilot signal loaded at a transmitter side.

In this embodiment, at a predetermined confidence probability, a power value of the pilot signal is larger than power values of all frequency points in a predetermined frequency domain range by a first threshold. The power of the pilot signal has been described in detail in Embodiment 1, its contents being incorporated herein, and being not going to be described herein any further.

In step 1401, for the frequency range of the pilot of the center channel, coarse frequency offset estimation may be performed on the center channel according to the wavelength drifting range designated by the laser, so as to obtain the frequency range of the pilot of the center channel. And for the frequency range of the pilot of the neighboring channel, a bandwidth of a signal passing through a shaping filter is determined as an initial frequency of the neighboring channel according to a bandwidth of an input signal at the transmitter side and a roll-off coefficient, and a frequency range starting from the initial frequency of the neighboring channel to a maximum value of a receiver bandwidth is taken as the frequency range of the pilot of the neighboring channel, or envelope extraction is performed on the power spectrum of the receiving signal, a frequency to which a first bottom in a frequency range greater than the frequency offset of the pilot of the center channel corresponds is taken as an initial frequency of a neighboring channel, and a frequency range starting from the initial frequency of the neighboring channel to a maximum value of a receiver bandwidth is taken as a frequency range of the pilot of the neighboring channel.

In step 1402, for a frequency offset of a pilot of the center channel, a frequency point satisfying the following condition may be found from the frequency range of the pilot of the center channel: a power value to which the frequency point corresponds is larger than power values of a predetermined number of frequency points around the frequency point by the first threshold, and then the frequency to which the frequency point corresponds is taken as the frequency offset of the pilot of the center channel. And for a frequency offset of a pilot of a neighboring channel, a frequency point satisfying the following condition may be found from a frequency range of the pilot of the neighboring channel: a power value to which the frequency point corresponds is larger than power values of a predetermined number of frequency points around the frequency point by the first threshold, and the frequency to which the frequency point corresponds is taken as the frequency offset of the pilot of the neighboring channel.

With the method of this embodiment, by using the features of the pilot signal loaded at the transmitter side, the frequency offset of the pilot is estimated at the receiver side by using the method based on the frequency domain signal processing, thereby achieving judgment of channel spacing.

An embodiment of the present disclosure provides a computer readable program code, which, when executed in a transmitter, will cause the transmitter to carry out the method as described in Embodiment 6.

An embodiment of the present disclosure provides a computer readable medium, including a computer readable program code, which will cause a transmitter to carry out the method as described in Embodiment 6.

An embodiment of the present disclosure provides a computer readable program code, which, when executed in a receiver, will cause the receiver to carry out the method as described in Embodiment 7.

An embodiment of the present disclosure provides a computer readable medium, including a computer readable program code, which will cause a receiver to carry out the method as described in Embodiment 7.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A signal processing apparatus, configured in a transmitter, the apparatus comprising:
a memory that stores a plurality of instructions; and
a processor coupled to the memory and configured to execute the instructions to:
load a pilot signal into a transmit signal, wherein, at a predetermined confidence probability, a power of the pilot signal being lamer than the power of all frequency points in a predetermined frequency domain range by a first threshold, and
determine a reference power of the pilot signal according to a receiver response, a variance of the transmitting signal, the predetermined frequency domain range and the predetermined confidence probability, and use a sum of the reference power of the pilot signal and the first threshold as power of the pilot signal.

2. An apparatus for monitoring channel spacing, configured in a receiver, the apparatus comprising:
a memory that stores a plurality of instructions; and
a processor coupled to the memory and configured to execute the instructions to:
determine a frequency range of a pilot of a center channel and a frequency range of a pilot of a neighboring channel by using a receive signal;
determine a frequency offset of the pilot of the center channel according to the frequency range of the pilot of the center channel, and determine the frequency offset of the pilot of the neighboring channel according to the frequency range of the pilot of the neighboring channel; and
determine a channel spacing between the center channel and the neighboring channel according to the frequency offset of the pilot of the center channel, the frequency offset of the pilot of the neighboring channel and a frequency of a pilot signal loaded on a transmitter side.

3. The apparatus according to claim 2, wherein for the frequency offset of the pilot of the center channel, the processor finds a frequency point satisfying a condition from the frequency range of the pilot of the center channel: power to which the frequency point corresponds being greater than power of a predetermined number of surrounding frequency points by a first threshold, and uses the frequency to which the frequency point corresponds as the frequency offset of the pilot of the center channel.

4. The apparatus according to claim 2, wherein for the frequency offset of the pilot of the neighboring channel, the processor finds a frequency point satisfying a condition from the frequency range of the pilot of the neighboring channel: power to which the frequency point corresponds being greater than power of a predetermined number of surrounding frequency points by a first threshold value, and uses the frequency to which the frequency point corresponds as the frequency offset of the pilot of the neighboring channel.

5. The apparatus according to claim 2, wherein at a predetermined confidence probability, power of the pilot signal is larger than power of all frequency points in a predetermined frequency domain range by a first threshold value.

6. The apparatus according to claim 2, wherein for the frequency range of the pilot of the center channel, the processor performs frequency offset coarse estimation on the center channel according to a wavelength drifting range designated by a laser to obtain the frequency range of the pilot of the center channel.

7. The apparatus according to claim 2, wherein for the frequency range of the pilot of the neighboring channel, the processor determines that a bandwidth of a signal passing through a shaping filter as an initial frequency of the neighboring channel according to a bandwidth of an input signal at a transmitter side and a roll-off coefficient, and uses a frequency range starting from the initial frequency of the neighboring channel to a maximum value of a receiver bandwidth as the frequency range of the pilot of the neighboring channel.

8. The apparatus according to claim 2, wherein for the frequency range of the pilot of the neighboring channel, the processor performs envelope extraction on a power spectrum of a receive signal, uses a frequency to which a first bottom in a frequency range greater than the frequency offset of the pilot of the center channel corresponds as an initial frequency of a neighboring channel, and uses a frequency range starting from the initial frequency of the neighboring channel to a maximum value of a receiver bandwidth as the frequency range of the pilot of the neighboring channel.

9. A communication system, comprising a transmitter and a receiver; wherein,
the transmitter being configured to: load a pilot signal into a transmit signal, wherein, at a predetermined confidence probability, power of the pilot signal being larger than power of all frequency points in a predetermined frequency domain range by a first threshold value; and
the receiver being configured to: determine a frequency range of a pilot of a center channel and a frequency range of the pilot of a neighboring channel by using a receive signal; determine a frequency offset of the pilot of the center channel according to the frequency range of the pilot of the center channel; determine the frequency offset of the pilot of the neighboring channel according to the frequency range of the pilot of the neighboring channel; and determine channel spacing between the center channel and the neighboring channel according to the frequency offset of the pilot of the center channel, the frequency offset of the pilot of the neighboring channel and a frequency of the pilot signal loaded at a transmitter side.

10. A signal processing apparatus, configured in a transmitter, the apparatus comprising:
a communication signal processor configured to:
determine a reference power of a pilot signal according to a receiver response, a variance of a transmit signal, a predetermined frequency domain range and a predetermined confidence probability, and sum the reference power of the pilot signal and a first threshold as power of the pilot signal, and
load the pilot signal into a transmit signal, wherein, at a predetermined confidence probability, the power of the pilot signal being larger than the power of all frequency points in the predetermined frequency domain range by the first threshold.

11. An apparatus for monitoring channel spacing, configured in a receiver, the apparatus comprising:
a communication signal processor configured to:
determine a frequency range of a pilot of a center channel and a frequency range of the pilot of a neighboring channel by using a receive signal;
determine a frequency offset of the pilot of the center channel according to the frequency range of the pilot of the center channel, and determine the frequency offset of the pilot of the neighboring channel according to the frequency range of the pilot of the neighboring channel; and
determine a channel spacing between the center channel and the neighboring channel according to the frequency offset of the pilot of the center channel, the frequency offset of the pilot of the neighboring channel and a frequency of a pilot signal loaded on a transmitter side.

\* \* \* \* \*